United States Patent
Kobayashi et al.

(10) Patent No.: US 8,611,381 B2
(45) Date of Patent: Dec. 17, 2013

(54) LASER OSCILLATOR CONTROL DEVICE

(75) Inventors: Eiji Kobayashi, Minamitsuru-gun (JP); Takeshi Watanabe, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/208,598

(22) Filed: Aug. 12, 2011

(65) Prior Publication Data

US 2012/0044962 A1    Feb. 23, 2012

(30) Foreign Application Priority Data

Aug. 23, 2010    (JP) .................................. 2010-186277

(51) Int. Cl.
*H01S 3/13*    (2006.01)

(52) U.S. Cl.
USPC .................... 372/29.02; 372/38.01; 372/38.02

(58) Field of Classification Search
USPC ............ 372/38.1–38.02, 38.09, 55–57, 29.02
See application file for complete search history.

(56) References Cited

U.S. PATENT DOCUMENTS

| | | | | |
|---|---|---|---|---|
| 5,579,328 | A * | 11/1996 | Habel et al. | 372/31 |
| 6,661,820 | B1 * | 12/2003 | Camilleri et al. | 372/38.09 |
| 2006/0291510 | A1 * | 12/2006 | Juluri | 372/29.021 |
| 2008/0138080 | A1 * | 6/2008 | Tyrrell et al. | 398/151 |

FOREIGN PATENT DOCUMENTS

| | | |
|---|---|---|
| CN | 1839357 A | 9/2006 |
| DE | 11 2004 000 220 T5 | 12/2005 |
| DE | 60 2004 005 946 T2 | 8/2007 |
| EP | 1 717 653 A3 | 1/2008 |
| JP | 62-003828 A | 1/1987 |
| JP | 62-107301 A | 5/1987 |
| JP | H01-156888 U | 10/1989 |
| JP | 2002-123301 | 4/2002 |
| JP | 2004-341995 A | 12/2004 |
| JP | 2005-196441 A | 7/2005 |
| JP | 2006-325390 | 11/2006 |
| JP | 2007-279933 A | 10/2007 |
| JP | 2008-126252 | 6/2008 |
| WO | WO-2005036288 A1 | 4/2005 |

* cited by examiner

*Primary Examiner* — Xinning Niu
(74) *Attorney, Agent, or Firm* — Drinker Biddle & Reath LLP

(57) ABSTRACT

A laser oscillator control device includes a controller having a transmitter section and a receiver section; a laser oscillator having a transmitter section and a receiver section and communicating with the controller via a communication line; wherein the laser oscillator control device outputs a control signal from the controller to the laser oscillator, based on a status signal indicating operational state of the laser oscillator sent from the laser oscillator to the controller. The controller has an alternating signal transmitter circuit that generates an alternating signal that changes at a predetermined period, and sends this alternating signal to the laser oscillator, and the laser oscillator has a return signal transmitter circuit which generates a return signal that changes periodically in correspondence to the alternating signal from the controller, and sends this return signal to the controller. Furthermore, the controller has a monitoring circuit monitoring the return signal from the laser oscillator, and if it determines that there is an abnormality in the return signal, outputs a stop control signal for stopping laser beam irradiation by the laser oscillator.

5 Claims, 4 Drawing Sheets

LASER OSCILLATOR CONTROL DEVICE

BACKGROUND OF THE INVENTION

1. Field of the Invention

The present invention relates to a laser oscillator control device for controlling a laser oscillator by means of communication with a controller.

2. Description of the Related Art

As such a laser oscillator control device, there is a conventionally known device in which comprises a watchdog timer for detecting an abnormality in execution of a control program, so that, when the abnormality in execution of the control program occurs, a gate signal for laser beam radiating means can be intercepted to stop laser beam irradiation. This device is described in Japanese Patent Publication No. 2008-126252 (JP2008-126252A). As a device having an I/O module and controlled by communication with a controller, there is a known device in which detects presence or absence of a periodic signal from the controller by a watchdog timer provided in the I/O module, and stops the output signal from the I/O module when the periodic signal is not detected. This device is described in Japanese Patent Publication No. 2002-123301 (JP2002-123301A).

When a laser oscillator is controlled by communication with a controller, a status signal indicating the operational state of the laser oscillator such as laser output data, data on laser gas pressure, power output data of an excitation power supply, etc., is sent to the controller, and the controller controls the laser oscillator based on the status signal. Therefore, if an abnormality occurs in transmission of signal from the laser oscillator, the controller can no longer properly control the laser oscillator.

However, the devices described in JP 2008-126252A and JP 2002-123301A can only detect an abnormality in the signal outputted from the controller, and cannot detect an abnormality in the signal sent from the laser oscillator to the controller. Therefore, when there is an abnormality in the transmission of signal from the laser oscillator, the laser oscillator may not be controlled in a desired manner.

SUMMARY OF THE INVENTION

One aspect of the present invention provides a laser oscillator control device comprising a controller having a transmitter section and a receiver section, and a laser oscillator having a transmitter section and a receiver section and communicating with the controller via a communication line, wherein the laser oscillator control device outputs a control signal from the controller to the laser oscillator, based on a status signal indicating operational state of the laser oscillator sent from the laser oscillator to the controller, wherein the controller has an alternating signal transmitter circuit generating an alternating signal that changes at a predetermined period, and sending this alternating signal to the laser oscillator, wherein the laser oscillator has a return signal transmitter circuit generating a return signal that changes periodically in correspondence to the alternating signal from the controller, and sending this return signal to the controller, and wherein the controller further has a monitoring circuit monitoring the return signal from the laser oscillator, and if it determines that there is an abnormality in the return signal, outputting a stop control signal for stopping laser beam irradiation by the laser oscillator.

BRIEF DESCRIPTION OF THE DRAWINGS

The objects, features and advantages of the present invention will become more apparent from the following description of embodiments taken in conjunction with the accompanying drawings, in which.

DETAILED DESCRIPTION

First Embodiment

Figure 1:
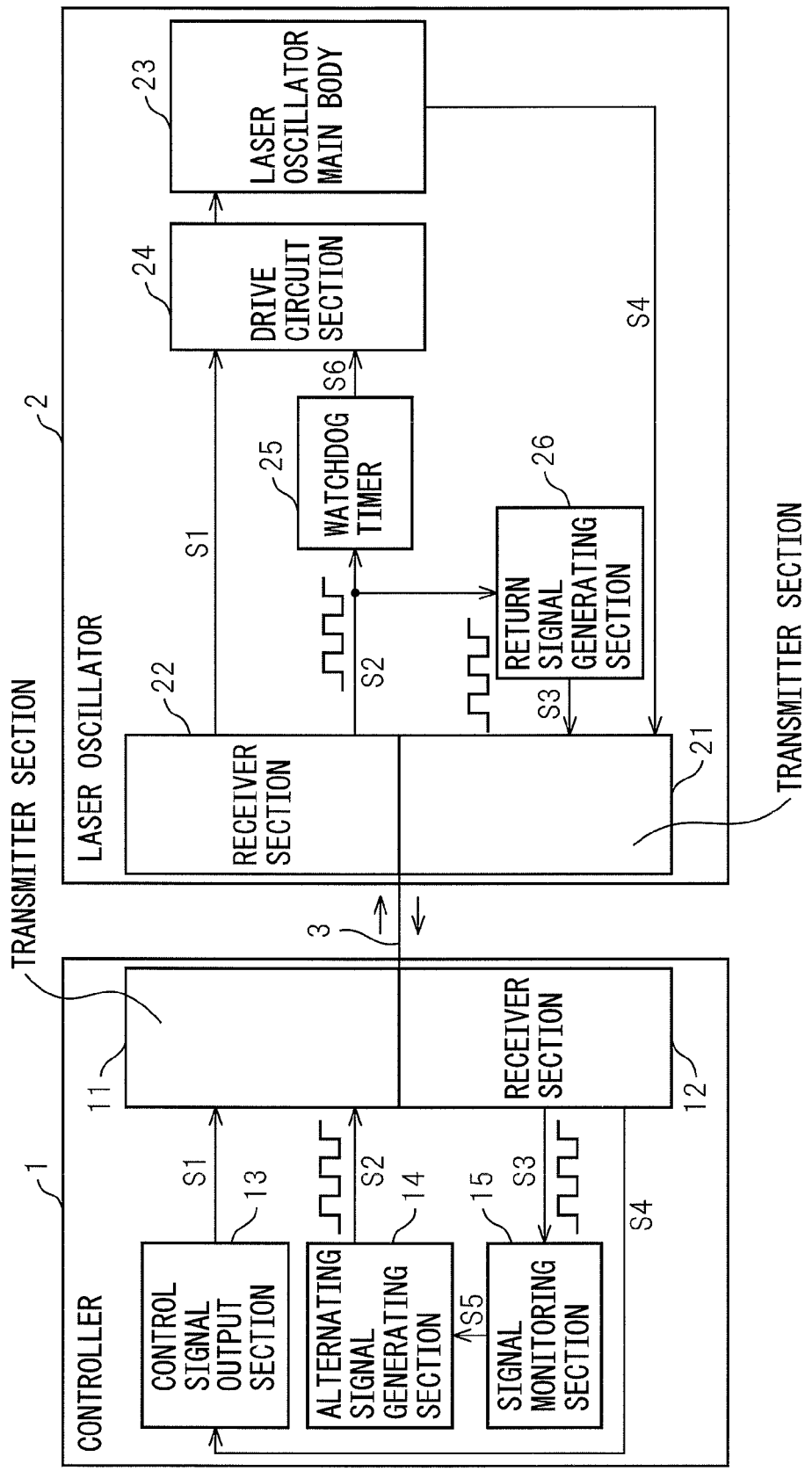
FIG. 1 is a view showing a general construction of the laser oscillator control device according to a first embodiment of the present invention.
Figure 2:
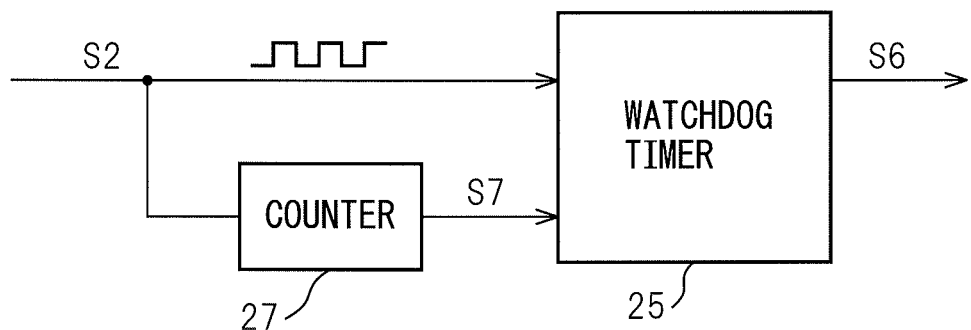
FIG. 2 is a view showing a variant of the embodiment shown in FIG. 1.

Hereinafter, a first embodiment of the present invention will be described below with reference to FIGS. 1 and 2. FIG. 1 is a view showing a general construction of the laser oscillator control device according to the first embodiment of the present invention. This laser oscillator control device comprises a controller 1 and a laser oscillator 2 connected so as to permit for serial communication with each other via a communication cable 3. More specifically, the laser oscillator control device is a laser oscillator control system.

As shown in FIG. 1, the controller 1 has a transmitter section 11 for sending signal to the laser oscillator 2 and a receiver section 12 for receiving signal from the laser oscillator 2. Similarly, the laser oscillator 2 has a transmitter section 21 for sending signal to the controller 1 and a receiver section 22 for receiving signal from the controller 1. Each of the transmitter sections 11 and 21 has a conversion circuit to convert parallel signal to serial signal, and each of the receiver sections 12 and 22 has a conversion circuit to convert serial signal to parallel signal.

The controller 1 comprises an operating processor having a CPU, a ROM, a RAM and other peripheral circuits, and has a control signal output section 13 for outputting a control signal S1 for controlling the laser oscillator 2, an alternating signal generating section 14 for generating an alternating signal S2, and a signal monitoring section 15 for monitoring a return signal S3 from the laser oscillator 2 in correspondence to the alternating signal S2.

To the control signal output section 13, a status signal S4 indicating operational state of the laser oscillator 2 such as laser output data, data on laser gas pressure, power output data of excitation power supply, etc., received by the receiver section 12 is inputted. The control signal output section 13 outputs a control signal S1 to the transmitter section 11 based on the inputted signal, and thereby controls the laser oscillator 2 in feedback so that the laser oscillator 2 can carry out a predetermined operation.

The alternating signal generating section 14 has a generating circuit which oscillates in accordance with the clock signal of the CPU, and generates the alternating signal S2 that changes in on-off form (in pulse shape) at a predetermined period as shown in FIG. 1, and outputs this alternating signal S2 to the transmitter section 11. If the controller 1 operates normally, the alternating signal S2 continues to be outputted from the alternating signal generating section 14, and if an abnormality occurs in the operation of the controller 1 (CPU), output of the alternating signal S2 is stopped.

The signal monitoring section 15 monitors the return signal S3 from the laser oscillator 2. The return signal S3 changes periodically (alternates) in correspondence to the alternating signal S2 as shown in FIG. 1, and the monitoring section 15 monitors the period at which the return signal S3 alternates, and determines the presence or absence of abnormality in the return signal S3. For example, if alternation of the return signal S3 is not detected after a predetermined time period has elapsed, it is determined that an abnormality has occurred in the return signal S3. When it is determined that an abnormality has occurred in the return signal S3, the signal processing section 15 outputs a stop signal S5 to the alternating signal generating section 14. When the stop signal S5 is outputted, the alternating signal generating section 14 stops output of the alternating signal S2.

The laser oscillator 2 comprises a drive circuit section 24 for controlling the drive of the laser oscillator main body 23 by the control signal S1 from the controller 1, a watchdog timer 25 for monitoring the alternating signal S2 received by the receiver section 22, and a return signal generating section 26 for generating a return signal S3 in correspondence to the alternating signal S2.

The laser oscillator main body 23 is a well-known type composed of, for example, a discharge tube and a pair of mirrors arranged at both sides of the discharge tube so as to form an optical resonator. When a power source for excitation of the discharge is activated and a high frequency voltage is applied to the electrodes of the discharge tube, discharge occurs and the medium gas in the discharge tube is excited, and therefore, a laser beam is outputted from the optical resonator. A shutter is provided in the laser beam output section of the optical resonator in order to optically intercept or transmit the laser beam.

The drive circuit section 24 outputs a control signal to the laser oscillator main body 23 in accordance with the control signal S1 from the controller 1 so as to control the operation of the laser oscillator main body 23, such as switching on and off of the discharge in the laser oscillator main body 23, magnitude of the discharge voltage, opening and closing of shutter, etc. The status signal S4 indicating operational state of the laser oscillator main body 23 is outputted to the transmitter section 21 for feedback control by the controller 1.

The watchdog timer 25 resets the timer every time when a pulse of the alternation signal S2 is inputted. If, after resetting, a predetermined time period t0 has elapsed and no pulse of the alternating signal S2 is inputted, the watchdog timer 25 completes timing (time is up) and outputs a stop signal S6 to the drive circuit section 24. Upon receiving the stop signal S6, the drive circuit section 24 stops the discharge of the laser oscillator main body 23, and closes the shutter in the laser output section to stop the laser irradiation by the laser oscillator 2.

The return signal generating section 26 generates a return signal S3 that changes periodically in correspondence to the alternating signal S2. For example, in the return signal generating section 26, the signal line of the alternating signal S2 and the signal line of the return signal S3 are short-circuited so as to output the alternating signal S2 as the return signal S3 to the transmitter section 21 to send it to the controller 1.

Principal operation of the laser oscillator control device according to the first embodiment will be described below. If there is no abnormality in CPU of the controller 1 nor in the signal transmitted from the laser oscillator 2, the return signal S3 in correspondence to the alternating signal S2 is sent from the laser oscillator 2 to the controller 1. In this case, since the signal monitoring section 15 determines that the return signal S3 is normal, the alternating signal S2 generated by the alternating signal generating section 14 continues to be sent to the laser oscillator 2, and the watchdog timer 25 is reset repeatedly. Therefore, the watchdog timer 25 does not output a stop signal S6 to the drive circuit section 24, and the controller 1 outputs the control signal S1 in accordance with the status signal S4 of the laser oscillator main body 23 and properly controls the laser oscillator 2 in feedback.

In contrast, if an abnormality occurs in the communication state of the transmitter section 21 or the receiver section 22 of the laser oscillator 2, normal return signal S3 is not generated by the return signal generating section 26, or the return signal S3 is not sent normally from the transmitter section 21. Therefore, the signal monitoring section 15 determines that there is an abnormality in the alternating period of the return signal S3, and outputs a stop signal S5 to the alternating signal generating section 14. When the stop signal S5 is outputted, output of the alternating signal S2 from the alternating signal generating section 14 is stopped. Therefore, the watchdog timer 25 completes timing and outputs the stop signal S6 to the drive circuit section 24.

The discharge of the laser oscillator main body 23 is thereby stopped, and the shutter of the laser output section is closed. As a result, the operation of the laser oscillator 2 is stopped. When an abnormality occurs in communication state of the laser oscillator 2, not only the return signal S3 but also the status signal S4 of the laser oscillator main body 23 is not normally sent to the controller 1. In this case, by stopping the operation of the laser oscillator 2, the laser oscillator 2 is prevented from operating erroneously. In case where an abnormality occurs in CPU of the controller 1, a pulse of the alternating signal S2 is not outputted. Therefore, the watchdog timer 25 likewise completes timing (time is up), and the operation of the laser oscillator 2 is stopped.

In accordance with the first embodiment of the invention, the following effects can be obtained.

(1) The alternating signal S2 is generated by the alternating signal generating section 14 provided in the controller 1 and is sent to the laser oscillator 2, and the return signal S3 in correspondence to the alternating signal S2 from the controller 1 is generated by the return signal generating section 26 provided in the laser oscillator 2 and is sent to the controller 1. In addition, the signal monitoring section 15 provided in the controller 1 monitors the return signal S3 from the laser oscillator 2, and if it determines that there is an abnormality in the return signal S3, it outputs a stop signal S5 to the alternating signal generating section 14 so as to stop output of the alternating signal S2. Therefore, when an abnormality occurs in communication state of the laser oscillator 2, the watchdog timer 25 completes timing and the operation of the laser oscillator 2 is stopped. As a result, undesired operation of the laser oscillator 2 can be avoided.

(2) Since a watchdog timer 25 operated by the alternating signal S2 from the controller 1 is provided in the laser oscillator 2, the operation of the laser oscillator 2 can be stopped even if an abnormality occurs in the controller 1.

(3) Since the common watchdog timer 25 can be used to stop the operation of the laser oscillator 2 both in the event of an abnormality in the controller 1 and in the event of an abnormality in the laser oscillator 2, the construction of the control device is simplified.

In the above described embodiment, the alternating signal S2 is generated by the alternating signal generating section 14 of the controller 1. However, in the initial start-up time of the controller 1, since the operation of the controller 1 may be unstable, the alternating period of the alternating signal S2 may not be constant, and thus, there is a possibility that the laser oscillator 2 erroneously detects a communication abnormality. Therefore, as shown in FIG. 2, a counter 27 may be provided in the laser oscillator 2 for counting the number of alternations of the alternating signal S2, so that, when the count of the alternation number after start-up of the controller 1 reaches a predetermined number, the counter 27 can output a drive start signal S7 to cause the watchdog timer 25 to start monitoring of the alternating signal S2. In this way, monitoring of the alternating signal S2 is carried out after stabilization of the communication state, and therefore, erroneous detection of communication abnormality can be avoided.

Second Embodiment

Figure 3:
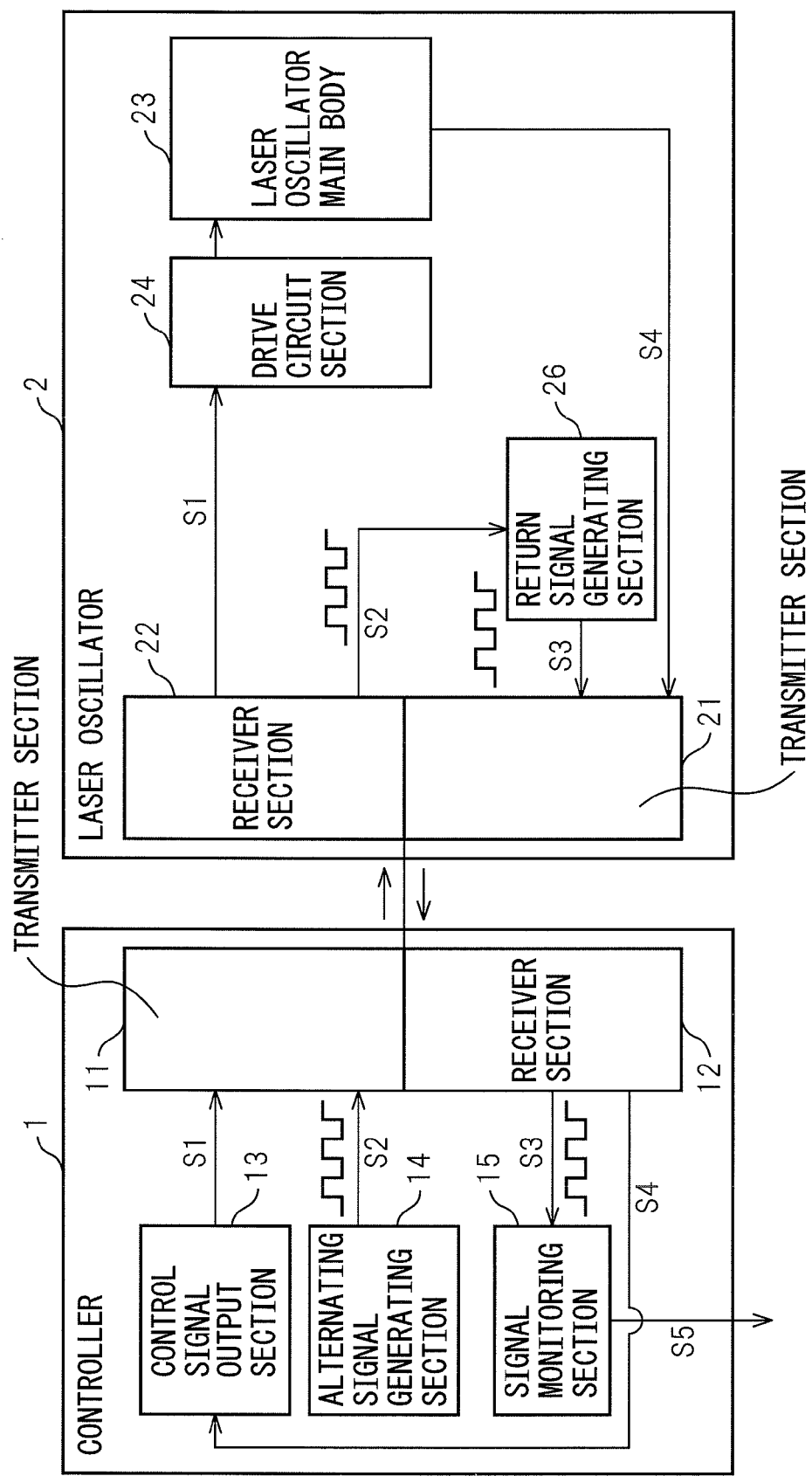
FIG. 3 is a view showing a general construction of the laser oscillator control device according to the second embodiment of the present invention.

A second embodiment of the present invention will be described below with reference to FIGS. 3 and 4. In the second embodiment, in the event of abnormality in the return signal S3, the controller 1 outputs a stop signal to the laser oscillator 2, not via the communication cable 3 that transmits the return signal S3. FIG. 3 is a view showing general construction of a laser oscillator control device according to the second embodiment of the present invention. The same components as in FIG. 1 are denoted by same reference numerals, and the difference from the first embodiment is mainly explained in the following.

As shown in FIG. 3, the watchdog timer 25 (FIG. 1) is not provided in the laser oscillator 2, and the alternating signal S2 from the controller 1 is converted via the return signal generating section 26 to the return signal S3, and is outputted to the transmitter section 21. The signal monitoring section 15 of the controller 1 determines the presence or absence of abnormality in the return signal S3, and if it is determined that there is an abnormality in the return signal S3 from the laser oscillator 2, a stop signal S5 is outputted to anywhere other than the alternating signal generating section 14. The stop signal S5 is a control signal for stopping laser irradiation by the laser oscillator 2, and the signal monitoring section 15 outputs the stop signal S5 not via the communication cable 3 where the return signal S3 has been sent. The watchdog timer 25 may be provided in the laser oscillator 2, as in the first embodiment.

Figure 4:
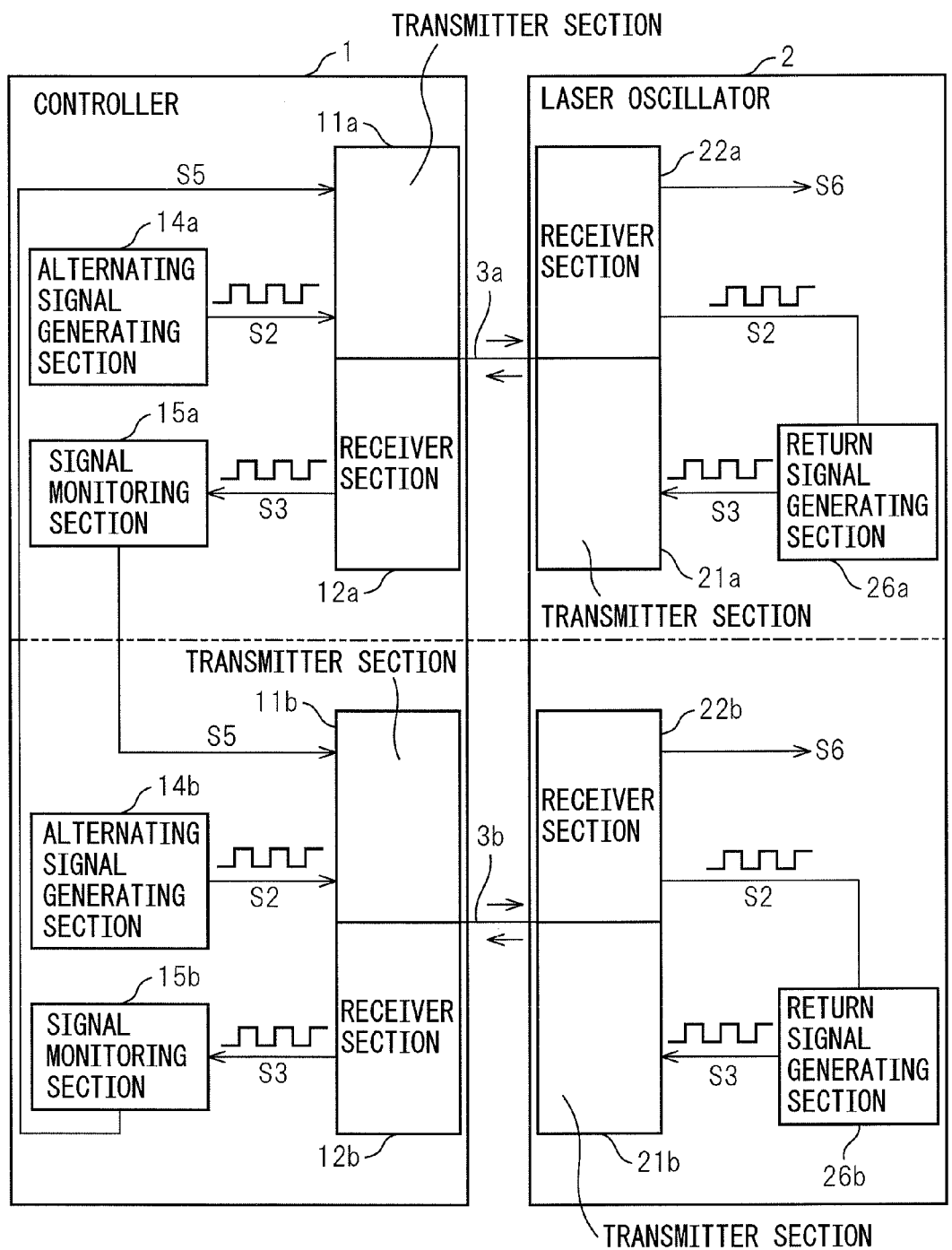
FIG. 4 is a view showing a specific example of the embodiment shown in FIG. 3.

FIG. 4 is a view showing the general construction of the laser oscillator control device including output form of the stop signal S5 of FIG. 3. In FIG. 4, the control signal output section 13 and the laser oscillator main body 23 and the drive circuit section 24 are omitted.

In FIG. 4, the entire control device is constructed from two systems of control construction shown in FIG. 3. More specifically, a pair of transmitter sections 11a and 11b, a pair of receiver sections 12a and 12b, a pair of alternating signal generating sections 14a and 14b, and a pair of signal monitoring sections 15a and 15b are respectively provided in the controller 1, and similarly, a pair of transmitter sections 21a and 21b, a pair of receiver sections 22a and 22b, and a pair of return signal generating sections 26a and 26b, are respectively provided in the laser oscillator 2. The transmitter and receiver sections 11a and 12a of the controller 1 are connected via first communication cables 3a to the transmitter and receiver sections 21a and 22a of the laser oscillator 2, and similarly, the transmitter and receiver sections 11b and 12b of the controller 1 are connected via second communication cables 3b to the transmitter and receiver sections 21b and 22b of the laser oscillator 2. Each signal generating section 14a and 14b, each signal monitoring section 15a and 15b, and each return signal generating section 26a and 26b executes same processing with each other, respectively. The return signal S3 is sent from the laser oscillator 2 to the controller 1 via the first communication cable 3a and the second communication cable 3b, respectively.

When one signal monitoring section 15a determines that there is an abnormality in the return signal S3 sent via the first communication cable 3a, the signal monitoring section 15a outputs a stop signal S5 to the transmitter section 11b, and the transmitter section 11b sends the stop signal S5 via the second communication cable 3b to the laser oscillator 2. When the receiver section 22b receives this stop signal S5, the receiver section 22b outputs a stop signal S6 to the drive circuit section 24, whereby the drive circuit section 24 stops the operation of the laser oscillator 2. When the other signal monitoring section 15b determines that there is an abnormality in the return signal S3 sent via the second communication cable 3b, the signal monitoring section 15b outputs a stop signal S5 to the transmitter section 11a, and the transmitter section 11a sends the stop signal S5 via the first communication cable 3a to the laser oscillator 2. When the receiver section 22a receives this stop signal S5, the receiver section 22a outputs a stop signal 56 to the drive circuit section 24, whereby the drive circuit section 24 stops the operation of the laser oscillator 2.

Thus, in the second embodiment, the controller 1 and the laser oscillator 2 are connected via a pair of communication cables 3a and 3b, so that, when the return signal S3 in one communication cable 3a (3b) is determined to be abnormal, a stop signal S5 is sent to the laser oscillator 2 via the other communication cable 3b (3a). Therefore, when an abnormality occurs in one of the communication lines, the other communication line can be used to reliably send the stop signal S5, and erroneous operation of the laser oscillator 2 can be reliably prevented.

In the embodiments described above (FIGS. 1 to~ 3), when the controller 1 and the laser oscillator 2 communicate with each other via a communication cable 3 (communication line), an alternating signal S2 is generated by the alternation signal generating section 14 as an alternating signal transmitter circuit, and is sent from the transmitter section 11, and a return signal S3 is generated by the return signal generating section 26 as a return signal transmitter circuit, and is sent from the transmitter section 21. Furthermore, the signal monitoring section 15 as a monitoring circuit determines presence or absence of abnormality of the return signal S3, and when it is determined that there is an abnormality, the signal monitoring section 15 outputs a stop signal S5 (stop control signal) to the alternating signal generating section 14. In particular, in FIG. 1, as a watchdog timer circuit, the watchdog timer 25 outputs a stop signal S6 (irradiation stop signal) in the event of abnormality in the alternating signal S2, and in FIG. 2, the counter 27 as a counter circuit counts alternation times so that monitoring of the alternating signal S2 is started after the number of alternations reaches a predetermined number. Furthermore, in the above embodiment (FIG. 4), alternating signal transmitter circuits of two lines and return signal transmitter circuits o two lines are provided, and if the signal monitoring section 15a and 15b as a stop control signal transmitter circuit determines that there is an abnormality in the return signal S3 from the first communication cable 3a (a first communication line), a stop signal S5 (a stop control signal) is outputted via the second communication cable 3b (a second communication line) to the laser oscillator 2, and the receiver section 22b as a stop signal outputting circuit that receives the stop signal S5 outputs a stop signal S6 (irradiation stop signal) to the drive circuit section 24.

These constructions are mere examples of the present invention, and any construction of the laser oscillator control device is permitted as long as the return signal S3 is generated by the laser oscillator 2 in correspondence to the alternating signal S2 from the controller 1, and presence or absence of abnormality in the return signal S3 from the laser oscillator 2 is determined by the controller 1, and when presence of abnormality is determined, a stop signal S5 is outputted.

In accordance with the present invention, since the controller monitors the return signal from the laser oscillator, and outputs the stop control signal if it determines that there is an abnormality in the return signal. Therefore, undesirable operation of the laser oscillator can be prevented in the event of an abnormality in the transmission from the laser oscillator.

While the present invention has been described with reference to the preferred embodiments thereof, it will be understood, by those skilled in the art, that various changes and modifications may be made thereto without departing from the scope of the appended claims.

The invention claimed is:

1. A laser oscillator control device comprising:
   a controller having a transmitter section and a receiver section;
   a laser oscillator having a transmitter section and a receiver section and communicating with the controller via a communication line, the laser oscillator further comprising a drive circuit to control operation of the laser oscillator;
   wherein the laser oscillator control device outputs a control signal from the controller to the drive circuit of the laser oscillator, based on a status signal indicating operational state of the laser oscillator sent from the laser oscillator to the controller,
   wherein the controller has an alternating signal transmitter circuit generating an alternating signal that changes at a predetermined period, and sends the alternating signal to the laser oscillator,
   wherein the laser oscillator has a return signal transmitter circuit generating a return signal that changes periodically in correspondence to the alternating signal from the controller, and sends the return signal to the controller, the alternating signal and the return signal bypassing the drive circuit of the laser oscillator, and
   wherein the controller further has a monitoring circuit monitoring the return signal from the laser oscillator, and if it determines that there is an abnormality in the return signal, outputs a stop control signal for stopping laser beam irradiation by the laser oscillator.

2. The laser oscillator control device of claim 1, wherein the laser oscillator has a watchdog timer circuit monitoring the alternating signal, and, if there is an abnormality in the alternating signal, outputs an irradiation stop signal in order to stop laser beam irradiation by the laser oscillator, and
   wherein the monitoring circuit stops transmission of the alternating signal from the controller if it determines that there is an abnormality in the return signal.

3. The laser oscillator control device of claim 2, wherein the laser oscillator has a counter circuit counting the number of alternations of the alternating signal sent from the controller, and when the number of alternations reaches a predetermined number, the watchdog timer starts monitoring of the alternating signal.

4. The laser oscillator control device of claim 1, wherein the controller has a stop control signal transmitter circuit sending the stop control signal from the monitoring circuit to the laser oscillator, and
   wherein the laser oscillator has a stop signal output circuit outputting an irradiation stop signal for stopping laser beam irradiation by the laser oscillator when the stop control signal is received.

5. The laser oscillator control device of claim 4, wherein the communication line comprises a first communication line and a second communication line,
   wherein the alternating signal transmitter circuit and the return signal transmitter circuit respectively send the alternating signal and the return signal via the first communication line, and
   wherein the stop control signal transmitter circuit sends the stop control signal from the monitoring circuit to the laser oscillator via the second communication line.

* * * * *